(12) United States Patent
Mueller

(10) Patent No.: US 9,823,025 B2
(45) Date of Patent: Nov. 21, 2017

(54) HEAT RECOVERY SYSTEM HAVING A PLATE HEAT EXCHANGER

(71) Applicant: MODINE MANUFACTURING COMPANY, Racine, WI (US)

(72) Inventor: Tobias Mueller, Aichtal (DE)

(73) Assignee: Modine Manufacturing Company, Racine, WI (US)

(*) Notice: Subject to any disclaimer, the term of this patent is extended or adjusted under 35 U.S.C. 154(b) by 225 days.

(21) Appl. No.: 14/662,647

(22) Filed: Mar. 19, 2015

(65) Prior Publication Data

US 2015/0276320 A1 Oct. 1, 2015

(30) Foreign Application Priority Data

Mar. 25, 2014 (DE) .......................... 10 2014 004 322

(51) Int. Cl.
| | | |
|---|---|---|
| *F28D 9/00* | (2006.01) | |
| *F02G 5/02* | (2006.01) | |
| *F28F 3/02* | (2006.01) | |
| *F28B 1/00* | (2006.01) | |
| *F28D 21/00* | (2006.01) | |

(52) U.S. Cl.
CPC ............ *F28D 9/0093* (2013.01); *F02G 5/02* (2013.01); *F28B 1/00* (2013.01); *F28D 9/005* (2013.01); *F28D 9/0037* (2013.01); *F28D 21/001* (2013.01); *F28D 21/0001* (2013.01); *F28F 3/027* (2013.01)

(58) Field of Classification Search
CPC .......... F28D 9/005; F28D 9/0093; F28D 9/02; F28D 7/0066; F28D 7/0075; F28D 7/0083; F28D 7/0091; F28D 7/1692; F02G 5/02; F02B 29/0412; F02B 29/0462
See application file for complete search history.

(56) References Cited

U.S. PATENT DOCUMENTS

| | | | |
|---|---|---|---|
| 6,182,746 B1 * | 2/2001 | Wiese | ..................... F28D 9/005 |
| | | | 165/166 |
| 6,843,311 B2 * | 1/2005 | Evans | ..................... F28D 9/005 |
| | | | 165/109.1 |
| 7,343,755 B2 | 3/2008 | Bogart | |
| 8,245,491 B2 | 8/2012 | Horek et al. | |
| 2006/0011323 A1 * | 1/2006 | Kume | ................... F28D 1/0333 |
| | | | 165/11.1 |

(Continued)

FOREIGN PATENT DOCUMENTS

| | | |
|---|---|---|
| DE | 102010025184 A1 | 12/2011 |
| DE | 202012001522 U1 | 5/2012 |

(Continued)

*Primary Examiner* — Tho V Duong
(74) *Attorney, Agent, or Firm* — Michael Best & Friedrich LLP

(57) ABSTRACT

A heat recovery system has an evaporator in which a working medium is evaporated, an expander by means of which energy from the working medium in vapor form is made usable, a recuperator operating as an internal heat exchanger, a condenser that condenses the working medium in vapor form, and a pump to move the working medium through a circuit. At least one plate heat exchanger with flow channels formed in interspaces between the heat exchanger plates is provided as a component of the system and includes at least the recuperator and the condenser.

6 Claims, 4 Drawing Sheets

(56) References Cited

U.S. PATENT DOCUMENTS

2006/0278377 A1* 12/2006 Martins ............... F02B 29/0412
                                                            165/140
2007/0125527 A1*  6/2007 Flik .................... F02B 29/0412
                                                            165/140
2012/0060550 A1   3/2012 Mann
2013/0186087 A1   7/2013 Gibble et al.

FOREIGN PATENT DOCUMENTS

FR   WO 2004042312 A1 *  5/2004  ................ F01P 9/06
JP          01033497 A  *  2/1989
KR       102012109678 A    10/2012

* cited by examiner

HEAT RECOVERY SYSTEM HAVING A PLATE HEAT EXCHANGER

CROSS-REFERENCE TO RELATED APPLICATION

This application claims priority to German Patent Application No. 10 2014 004 322 filed Mar. 25, 2014, the entire contents of which are hereby incorporated by reference herein.

BACKGROUND

The invention relates to a heat recovery system and to an associated plate heat exchanger.

Heat recovery systems which contain plate heat exchangers are known in various embodiments.

The system known from DE 10 2007 056 113 A1 comprises heat exchangers which are constructed from one or more plate stacks, which are positioned or accommodated in a housing. There, the plates are designed in such a way that they have a plurality of plate sections of different configurations, through which flow occurs in succession in the longitudinal direction of the plates and which are used optionally as recuperators and as condensers and/or as other heat exchangers in the system, e.g. as evaporators and preheaters or superheaters.

According to FIG. 5 of this reference, all the working medium coming from the turbine, which is still in vapor form, passes through a circuit of the system and is used for heat recovery, and flows through an opening into the housing and acts upon a first plate section, which acts as a recuperator. In this plate section or recuperator, heat exchange is carried out between the working medium, which is still quite hot, and condensed and cool working medium emerging from the condenser. Such recuperators are often referred to as internal heat exchangers (IHX). The already somewhat cooled working medium then flows into a subsequent plate section of different configuration, in which condensation thereof takes place.

SUMMARY

It is an object of the invention to further improve the system and the plate heat exchanger.

One solution according to the invention is obtained with a heat recovery system which has an evaporator in which a working medium is evaporated by means of the exhaust gas energy, an expander by means of which energy from the working medium in vapor form is made usable, a recuperator operating as an internal heat exchanger, a condenser that condenses the working medium in vapor form, and a pump to move the working medium through a circuit. At least one plate heat exchanger with flow channels formed in interspaces between the heat exchanger plates is provided as a component of the system and includes at least the recuperator and the condenser.

In some preferred embodiments of the invention the plate heat exchanger is embodied without a housing, wherein trough-shaped heat exchanger plates have at least four openings and are arranged in a single stack in such a way that the openings form sections of vertical channels which extend at least through a first part of a height of a single stack, wherein the first part of the stack forms the recuperator, that a second or central part of the height of the stack forms the condenser, and that a third part of the height of the stack forms a supercooler for the working medium.

Construction without a housing is a construction in which rims of the trough-shaped heat exchanger plates or the rim of the stack formed therefrom simultaneously form the outer rim of the heat exchanger or the peripheral contour thereof. Often, rims of thicker plates at the top and/or bottom end of the stack project beyond the peripheral contour of the stack.

In some embodiments an inlet connection for the working medium still in vapor form is arranged at an aperture in a thicker plate belonging to the recuperator. The aperture represents an extension of the inlet channel. Only a partial flow of the vapor flows through at least one flow channel of the recuperator.

In some embodiments a main partial flow of the vapor flows onward in a straight line from the inlet connection into an inlet channel of the condenser and through the flow channels thereof allocated to the working medium.

In some embodiments, of the small number of heat exchanger plates provided in the recuperator, at least the lower heat exchanger plate, which rests on the thicker plate mentioned, has a significantly greater plate thickness than the other heat exchanger plates. This takes account of the significantly higher pressure of the supercooled working medium prevailing in the recuperator. In the flow channel formed by this thicker heat exchanger plate there is a ridge.

The ridge also contains openings, which can be taken to be part of the channel sections mentioned. There can also be such ridges or similar ridges in other flow channels.

The plate heat exchanger constructed without a housing is lighter and more compact than the one used in the prior art cited at the outset. Since the plates of the plate heat exchanger as described do not have plate sections of different configuration but can be of uniform and flat design, the production thereof likewise appears to be associated with lower costs for tools or the like.

It is, in particular, the division of the working medium in vapor form into the main partial flow mentioned and the partial flow which flows through the recuperator that has an efficiency-boosting effect because the system efficiency of a Rankine system rises. The recuperator furthermore speeds up the warm-up phase of the overall system and reduces the load on the condenser. The heat to be absorbed by the coolant is significantly reduced. This heat must often be dissipated as lost heat to the environment. It can therefore be advantageous to limit the heat to be absorbed by the coolant in order to reduce lost heat. In this context, it has been found that in some preferable embodiments the partial flow is less than 15%, preferably less than 10%, of the overall flow of the working medium, even more preferably about 5-10%. This order of magnitude for the proportion of the partial flow leads to a well-balanced overall system as regards efficiency.

In comparison to a separately arranged recuperator, this measure also ensures that the pressure loss in the working medium is significantly lower, as has already been found.

One of the inlet channels and one of the outlet channels are allocated a liquid coolant, which brings about the condensation and supercooling of the working medium. The channels mentioned therefore can extend continuously through the third part of the plate stack (supercooler) and through the second, central part of the plate stack (condenser). They are hydraulically connected by associated flow channels.

The recuperator can have a small number of flow channels for the partial flow of the working medium, and only a single flow channel in one illustrative embodiment. After flowing through the flow channel mentioned, the partial flow of the working medium combines in the outflow channel of the condenser with the main partial flow of the working medium, which has flowed through the flow channels thereof. The overall flow flows onward via the condenser outflow channel mentioned into the inflow channel of the supercooler.

The outflow channel of the condenser can be on a straight path to the inflow channel of the supercooler or can be arranged in one and the same axial direction as the inflow channel of the supercooler.

Attention is also drawn to the disks which are inserted into the channels of the plate heat exchanger, which serve to form the channel sections mentioned.

The invention is described in greater detail below in an illustrative embodiment with reference to the attached drawings. The features and advantages thereof will become apparent from the following description.

DETAILED DESCRIPTION

Figure 1:
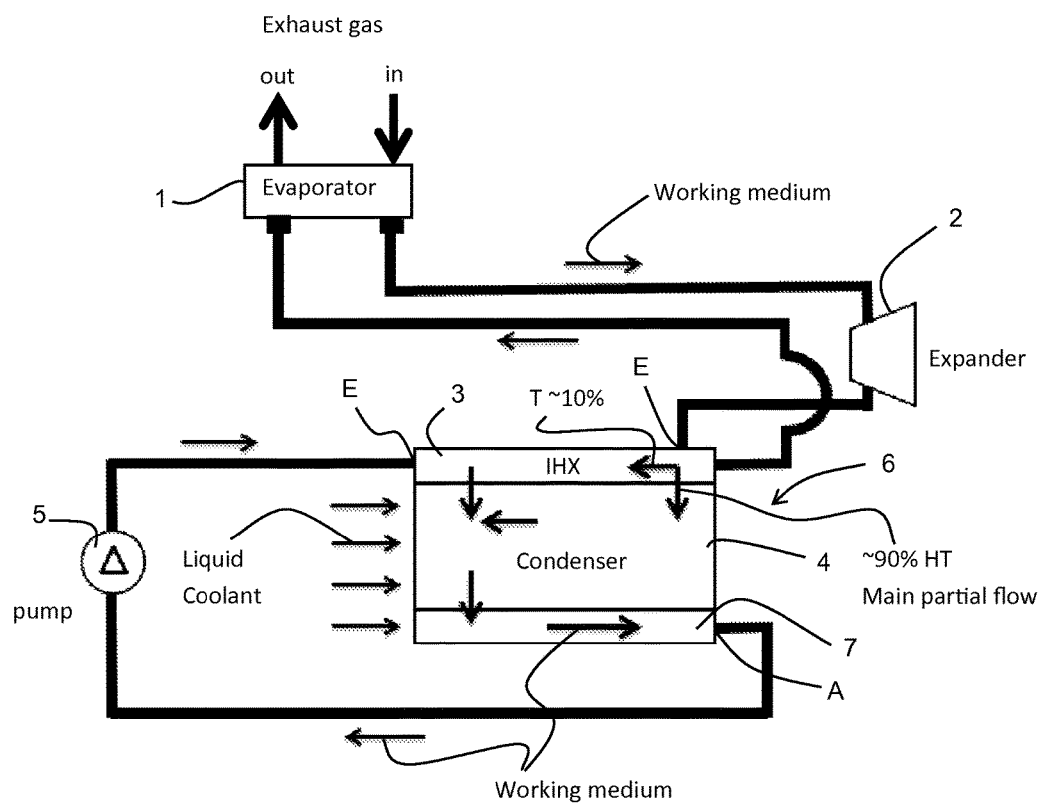
FIG. 1 is shows a heat recovery system in which the invention is implemented.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The heat recovery system for recovering heat, e.g. from exhaust gas energy of an internal combustion engine, includes an evaporator 1, in which a working medium is evaporated by means of the exhaust gas energy, and an expander 2, having a generator (not shown), which supplies the energy of the working medium in vapor form as electric energy, for example. Also visible in FIG. 1 are a recuperator 3 having inlets and outlets E, A, which operates as an internal heat exchanger IHX, a condenser 4 having inlets and outlets E, A, which condenses the working medium in vapor form, and a pump 5, which moves the working medium leaving the condenser 4 or a supercooler 7, i.e. the condensate, through a circuit.

In principle, FIG. 1 is furthermore also intended to show a plate heat exchanger 6, with flow channels formed in interspaces between heat exchanger plates 60, as a component of the system or circuit.

Figure 2:
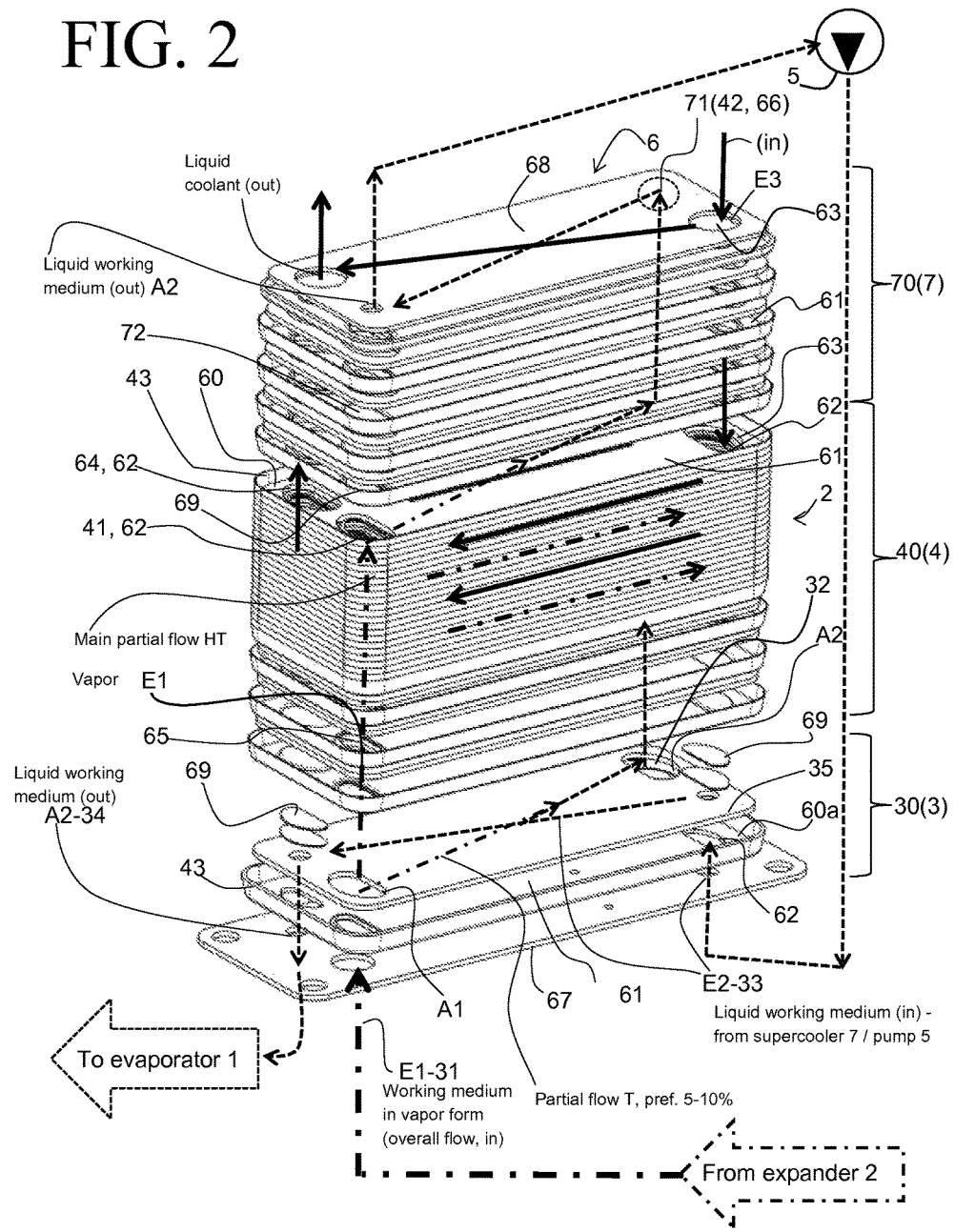
FIG. 2 shows a plate heat exchanger which is used in the system shown in FIG. 1. The lower part of the single stack comprising heat exchanger plates and the upper part thereof can be seen in an exploded view to enable important details to be clarified.

In FIG. 2, the arrows in solid lines are intended to indicate a liquid coolant, while arrows in dashed lines show condensed working medium, supercooled or not yet supercooled. The arrows in dash-dotted lines are intended to represent working medium that is still hot, i.e. which is at least predominantly in vapor form. In adjacent flow channels 61 between the heat exchanger plates 60, the flow directions cross, as the arrows can indicate. Accordingly, inlet E and outlet A for the same medium are always in diagonal corners of the heat exchanger plates 60. That is also the case in the central stack part 40, which forms the condenser 4 and takes up the largest part of the stack of the plate heat exchanger 6.

The plate heat exchanger 6 is constructed without a housing (FIG. 2). It consists of trough-shaped heat exchanger plates 60 with an obliquely raised rim 43 and with four openings 62, which are arranged in a single stack. The openings 62 are arranged in the mentioned corner regions of the heat exchanger plates 60. The openings 62 form four channels 63-66, which are vertical relative to the flow channels 61 and extend at least through a first part 30 of a height of the single stack.

Accordingly, the upright channels 63-66 are each situated vertically extending through the stack in the corner regions of the heat exchanger plates 60. However, they are not connected hydraulically through the entire stack. The channels 63-66 are namely interrupted or closed hydraulically at several points in the stack. As will become apparent below, there are channel sections which are completely separated hydraulically from the channels 63-66. There are other channel sections in which only deflection occurs, i.e. a hydraulic connection is maintained in these other channel sections.

The first part 30, the lower part of the stack in the illustrative embodiment shown in FIG. 2, forms the recuperator 3. A second or central part 40 of the height of the stack forms the condenser 4, and a third part 70 of the height of the stack operates as a supercooler 7 for the working medium. As is merely indicated in FIG. 1, there are other embodiments in which the third part 70 is arranged at the bottom and the first part 30 is arranged at the top.

The second or central part 40 represents the majority of the plate heat exchanger 6, followed by the third part 70 and then by the first part 30, the size of the parts being determined by the number of heat exchanger plates 60.

The inlet channel 71 into the supercooler 7 for the working medium to be super-cooled is not visible in the view according to FIG. 2. However, it should be recognized that it extends through the stack part 70 of the supercooler 7 approximately at the point marked by 71. It is also clear that this inlet channel 71 is in alignment in stack part 40 with the outlet channel 42 (likewise not visible) of the condenser 4.

Of the four vertical channels 63-66 of the recuperator 3 or of the channel sections thereof, one is an inlet channel 31 and the second is an outlet channel 32 for the working medium to be condensed. The third channel is an inlet channel 33 and the fourth, in turn, is an outlet channel 34 for condensed and supercooled working medium, which forms a coolant in the recuperator 3. This coolant is introduced into the recuperator 3 and, after heat exchange has taken place, is discharged again so as to flow onward through the system, more precisely initially toward the evaporator 1.

It can furthermore be seen from FIG. 2 that a cross section of the inlet corresponds to a cross section of the outlet for working medium to be condensed. The cross sections of the inlet and of the outlet for condensed working medium are also of the same shape and size but significantly smaller than the first-mentioned cross sections.

The inlet E and the outlet A for the supercooled working medium are arranged on an outer, thicker plate 67 of the recuperator 3 and in a ridge 35 in a flow channel 61 of the recuperator 3 and condenser 4. The recuperator 3 has a thicker heat exchanger plate 60a, which rests on the thicker plate 67 to enable the high pressure differences to be managed (see also FIG. 3).

The inlet E for the working medium to be condensed and the outlet A for the same working medium are provided on opposite sides of the recuperator 3 when viewed in the plane of the plates. Outlet A opens directly into the outlet channel 42 of the condenser 4, which is an extension of the outlet channel 32 of the recuperator 3.

An inlet channel 41 of the condenser 4, which reaches as far as the end of the second, central stack part 40, extends in a straight line with the inlet channel 31 of the recuperator 3.

The inlet channel 41 of the condenser 4 is closed to the working medium to be condensed—toward the third stack part 70—by means of a disk 69 or the like at the end of the second, central stack part 40. That is not clearly apparent from FIG. 2 but has been marked at the end mentioned by reference sign 69. There are further disks 69 at other points in the plate heat exchanger 6, and these will be described in detail below.

The outlet channel 42 of the condenser 4 for the at least largely already condensed working medium opens into an inlet channel 71 of the supercooler 7, which is an extension of the outlet channel 42 extending in a straight line to the end of the third stack part 70.

A cross section of the outlet A2 of the condenser corresponds to a cross section of the inlet E2 of the supercooler. They have the same shape and size. A cross section of the outlet A2 of the supercooler 7 for condensed working medium, which is arranged in another outer, thicker plate 68, is furthermore significantly smaller than the first-mentioned cross sections.

Two of the vertical channels, beginning at the third stack part 70, extend through the third and through the second, central stack part 40, wherein one is an inlet channel 63 and the other is an outlet channel 64 for a liquid coolant. The channels 63, 64 are connected hydraulically by the associated flow channels 61.

An inlet E3 and an outlet A3 for the liquid coolant on the other outer, thicker plate 68 of the third stack part 70 are preferably arranged as a straight-line extension of inlet channel 63 and of outlet channel 64 respectively.

Inlet channel 63 and outlet channel 64 are each closed by means of an already mentioned disk 69 or the like at one end of the second, central stack part 40.

As can also be seen from FIG. 2, only a partial flow T of the vapor flows through at least one flow channel 61 of the recuperator 3. The aim is that the partial flow T should have been at least very largely condensed after flowing through the recuperator 3. In the illustrative embodiment shown, the proportion of the partial flow T of an overall flow is about 10%.

A main partial flow HT of the working medium or vapor flows onward in a straight line from the inlet channel 31 of the recuperator 3 into the inlet channel 41 of the condenser 4 and through the flow channels 61 thereof allocated to the working medium. The inlet channels 31, 41 preferably have the same cross sections.

The partial flow T which has passed through the recuperator combines at the outlet channel 42 of the condenser 4 with the main partial flow HT emerging from the flow channels 61 mentioned and is united to give the at least very largely condensed overall flow.

In this illustrative embodiment, the recuperator 3 has just a single flow channel 61 for the working medium in vapor form. In illustrative embodiments that are not shown, the number of flow channels 61 is somewhat greater but significantly less than those of the supercooler 7, for example.

The openings 62 in the heat exchanger plates 60 are surrounded by a formed rim 44. The inlet and outlet channels 63-66, 41, 42, 71, 72 etc. are formed by mutually abutting rims 44 of the openings 62 of adjacent heat exchanger plates 60, as can be seen from FIG. 2 but even better from FIGS. 3 and 4.

Figure 3:
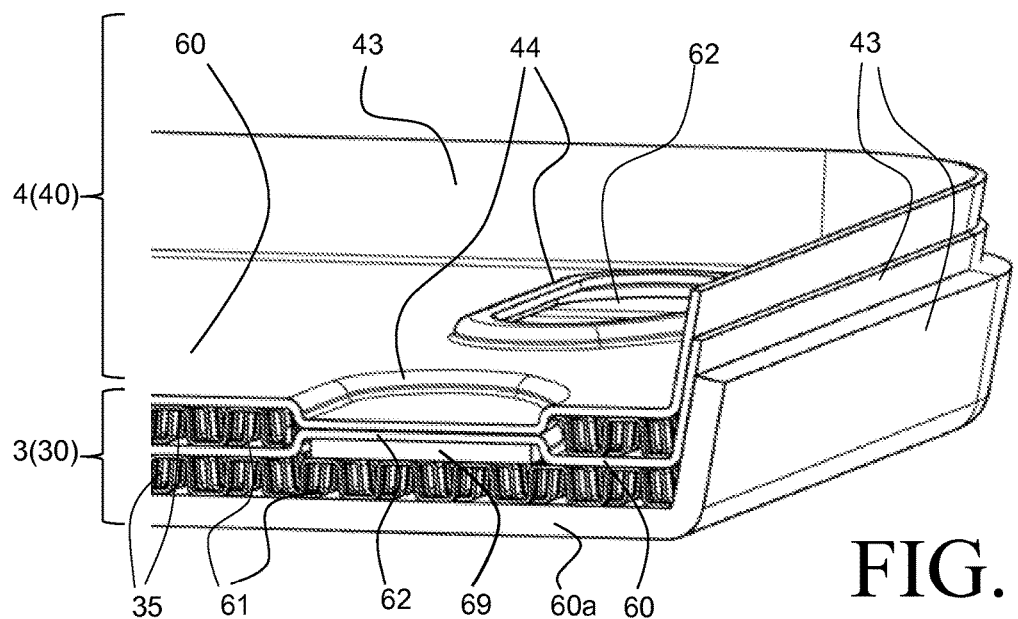
FIGS. 3 to 5 show details of the plate heat exchanger from FIG. 2.
Figure 4:
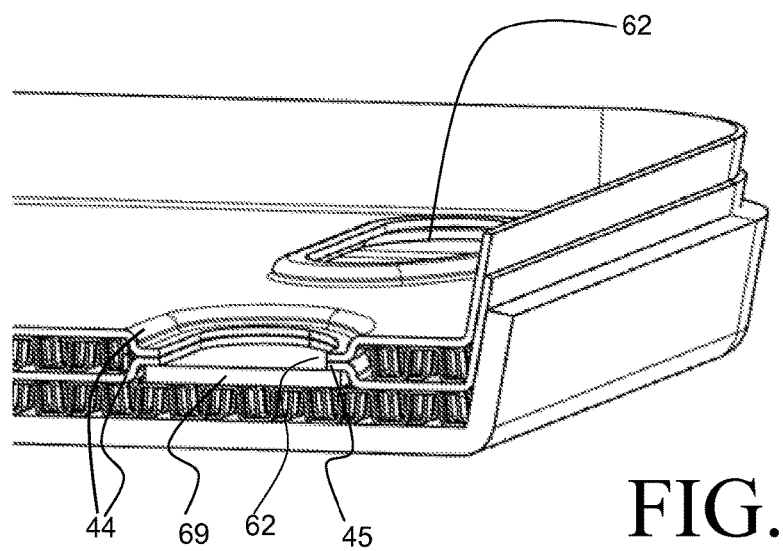

In two heat exchanger plates 60, which are arranged between the first part 30 and the second part 40 of the stack, two of the openings 62 are closed, not having been punched out for example. FIGS. 3 and 4 practically show a section in the region of the openings or a section through a channel section.

These "closed openings" also have formed rims 44. Disks 69 can also be inserted in the "closed openings" and within the formed rims 44 in order to provide a stability-boosting effect. The thickness of the disks 69 compensates approximately for a rim height of the formed rims. The disks 69 are connected on one flat side thereof to a ridge 35 arranged in the associated flow channel 61. The other flat side of the disks 69 is situated in the "closed openings" 62 (FIG. 3). This embodiment preferably applies to the separation of the second stack part 40 from the first stack part 30 and is advantageous on account of the high internal pressure prevailing there, which has already been mentioned above, because higher stability is achieved.

The joint mentioned is preferably formed by brazed joints since the entire plate heat exchanger 6 is a brazed construction. In FIG. 2, there are in each case two disks 69 at the opening 62. These two disks can be replaced by a single disk 69. The pressure differences between the supercooled working medium and the working medium in vapor form in the recuperator 3 can be in the region of more than 20 bar.

Not all the openings 62 of the heat exchanger plates 60 situated between the stack parts are "closed" in this way. The openings can also be of identical design to other openings 62—that is to say openings 62 that are punched out and thus form actual openings forming the channels 63-66—in which case the closure thereof is then accomplished by means of the disks 69 themselves since the formed rims 44 mentioned generally have a narrow inward-oriented rim region 45 which is ideally suited to supporting the disk edges and thus bringing about the closure of the openings 62 (FIG. 4). It is advisable to do this when relatively low pressure differences are pre-sent. This applies, for example, to the closure of the channels 63, 64 on the coolant side. It appears to be more advantageous in terms of manufacture, e.g. in respect of the production of forming tools etc., to punch out the openings 62. FIG. 4 shows this state of affairs in conjunction with the recuperator 3 although—as mentioned—it is preferably present for the closure of the coolant side, i.e. of channels 63 and 64.

In the case of particularly high stability requirements, a second disk 69 can be inserted from the upper side of the heat exchanger plates 60, said side being the side visible in FIGS. 3 and 4. Moreover, it would also be possible to provide just one of the un-punched openings for example, in contrast to FIG. 4, in which both openings of both plates 60 are un-punched. Similar variations apply to the embodiment in FIG. 3.

Figure 5:
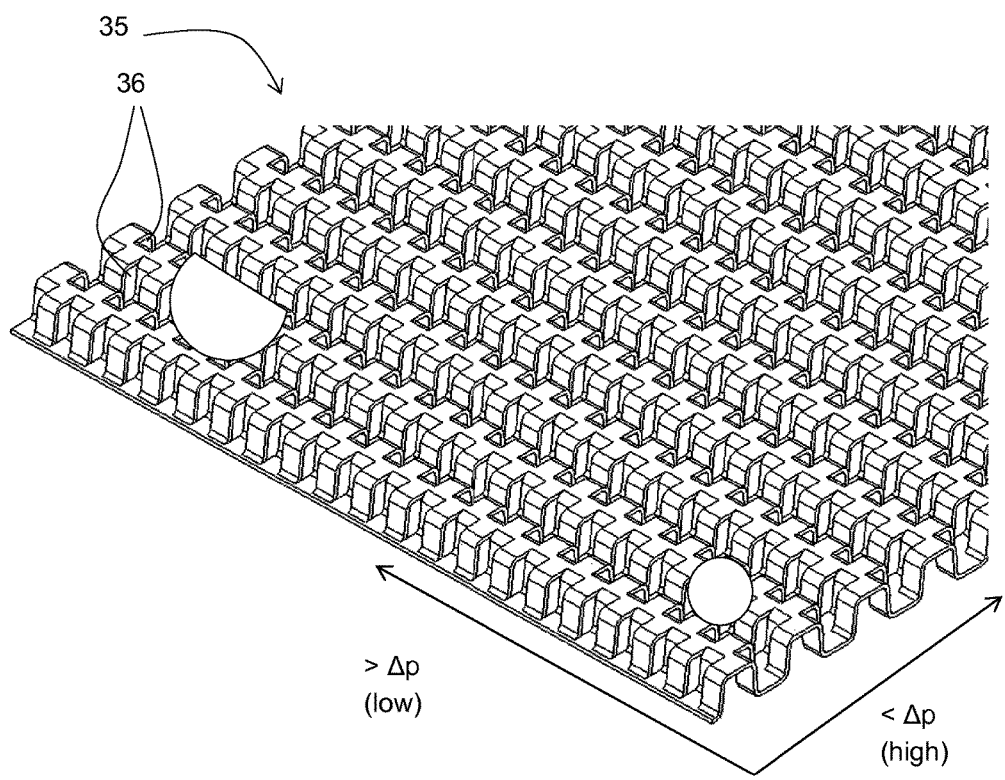

The ridges 35 (FIG. 5) mentioned have a corrugated structure. Offset cuts 36 are arranged in the corrugation flanks. As a result, such ridges 35 have a direction of flow with a high flow resistance (pressure loss Δp) and a direction of flow, perpendicular thereto, with a significantly lower flow resistance. There is a diagonal flow through these ridges 35, making it possible to achieve a good compromise in respect of pressure loss and heat exchange efficiency. The ridges 35 occupy the entire flow channel 61. Such ridges are preferably situated in the flow channels 61 of the recuperator 3. There can also be turbulators of different design in the other flow channels 61 of the plate heat exchanger 6.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A plate heat exchanger for a heat recovery system, comprising:
   a plurality of trough-shaped heat exchanger plates arranged to form a vertical stack, rims of the plates engaging to form the outer peripheral contour of the plate heat exchanger, flow channels being provided in the interspaces between the plates;
   a first inlet port and a first outlet port arranged at a first end of the stack, the first inlet port and the first outlet port being in fluid communication with a first subset of the flow channels;
   a second inlet port arranged at the first end of the stack and in fluid communication with a second subset of the flow channels interleaved with the first subset, the first and second subsets of the flow channels together defining a recuperator of the heat recovery system;
   a second outlet port arranged at a second end of the stack opposite the first end and in fluid communication with a third subset of the flow channels;
   a third inlet port and a third outlet port arranged at the second end of the stack, the third inlet port and the third outlet port being in fluid communication with a fourth subset of the flow channels interleaved with the third subset, the third and fourth subsets of the flow channels together defining a supercooler of the heat recovery system;
   a fifth subset of the flow channels arranged between the recuperator and the supercooler and in fluid communication with the second inlet port, the fifth subset of the flow channels being fluidly in parallel with the second subset of flow channels, the third subset of flow channels being arranged in series with both the second and the fifth subsets of flow channels to receive the combined fluid flow therefrom; and
   a sixth subset of the flow channels interleaved with the fifth subset, the sixth subset of the flow channels being fluidly in parallel with the fourth subset of the flow channels, the fifth and sixth subsets of the flow channels together defining a condenser of the heat recovery system.

2. The plate heat exchanger of claim 1, wherein the trough-shaped heat exchanger plates are provided with aligned openings to enable the fluid communication between said subsets of flow channels and said inlet and outlet ports.

3. The plate heat exchanger of claim 1, wherein the first subset of the flow channels consists of a single one of the flow channels.

4. The plate heat exchanger of claim 3, wherein said single one of the flow channels is the outermost flow channel at the first end of the stack, and wherein the second subset of the flow channels consists of another single one of the flow channels.

5. The plate heat exchanger of claim 1, wherein an outermost one of the plurality of trough-shaped heat exchanger plates at the first end of the stack has a significantly greater plate thickness than the other ones of the plurality of trough-shaped heat exchanger plates.

6. The plate heat exchanger of claim 1, wherein the fifth and sixth subsets of the flow channels together constitute a majority of the flow channels provided in the interspaces between the plates.

* * * * *